United States Patent
Shi et al.

(10) Patent No.: US 11,517,026 B2
(45) Date of Patent: Dec. 6, 2022

(54) METHOD FOR CONTROLLING A PROCESS OF ROASTING COFFEE BEANS AND DEVICE FOR USE IN A PROCESS FOR ROASTING COFFEE BEANS

(71) Applicant: KONINKLIJKE PHILIPS N.V., Eindhoven (NL)

(72) Inventors: Jun Shi, Eindhoven (NL); Yanyan Wang, Eindhoven (NL); Declan Patrick Kelly, Eindhoven (NL); Jingwei Tan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 686 days.

(21) Appl. No.: 15/503,745

(22) PCT Filed: Sep. 8, 2015

(86) PCT No.: PCT/EP2015/070417
§ 371 (c)(1),
(2) Date: Feb. 14, 2017

(87) PCT Pub. No.: WO2016/037993
PCT Pub. Date: Mar. 17, 2016

(65) Prior Publication Data
US 2017/0251691 A1    Sep. 7, 2017

(30) Foreign Application Priority Data

Sep. 11, 2014 (WO) ............... PCT/CN2014/086303
Oct. 10, 2014 (EP) ..................................... 14188489

(51) Int. Cl.
*A23F 5/04* (2006.01)
*A23N 12/12* (2006.01)

(52) U.S. Cl.
CPC ............... *A23F 5/04* (2013.01); *A23N 12/12* (2013.01); *A23N 12/125* (2013.01)

(58) Field of Classification Search
CPC ................................................. G01N 15/0227
See application file for complete search history.

(56) References Cited

U.S. PATENT DOCUMENTS

| 4,425,720 | A | * | 1/1984 | Elevitch | ................ | A23N 12/08 219/386 |
| 4,602,147 | A | | 7/1986 | Gell | | |

(Continued)

FOREIGN PATENT DOCUMENTS

| CN | 2884923 Y | 4/2007 |
| CN | 202364775 U | 8/2012 |

(Continued)

OTHER PUBLICATIONS

Dorfner et al., Laser Mass Spectrometry as On-Line Sensor for Industrial Process Analysis: Process Control of Coffee Roasting (Year: 2004).*

(Continued)

*Primary Examiner* — Erik Kashnikow
*Assistant Examiner* — Lela S. Williams
(74) *Attorney, Agent, or Firm* — Schott, P.C.

(57) ABSTRACT

A device for use in a process for roasting coffee beans comprises measuring means (10) for performing measurements of an actual value of particulate matter emission from the coffee beans during a process of roasting the coffee beans, and controlling means (20) coupled to the measuring means (10) for receiving the outcome of the measurements from the measuring means (10), wherein the controlling means (20) are adapted to find a pattern of the particulate matter emission over time on the basis of the outcome of the measurements, to determine an actual roasting degree of the (Continued)

coffee beans on the basis of the pattern, and to determine and set at least one characteristic of the roasting process on the basis of the roasting degree.

19 Claims, 6 Drawing Sheets

(56) References Cited

U.S. PATENT DOCUMENTS

| | | | |
|---|---|---|---|
| 4,631,838 | A | 12/1986 | Eichler |
| 7,838,799 | B2 | 11/2010 | Freedman |
| 2014/0241590 | A1 | 8/2014 | Day, Jr. et al. |
| 2014/0242239 | A1* | 8/2014 | Boggavarapu ...... A47J 31/4492 426/433 |

FOREIGN PATENT DOCUMENTS

| | | |
|---|---|---|
| CN | 105249505 A | 1/2016 |
| CN | 105636461 B | 5/2017 |
| CN | 107072427 B | 8/2019 |
| EP | 0470254 A4 | 7/1992 |
| EP | 0470254 A1 | 7/2008 |
| JP | 2001254959 A | 9/2001 |
| JP | 2001-522593 A | 11/2001 |
| JP | 2013160167 A | 8/2013 |
| JP | 2014011984 A | 1/2014 |
| JP | 2017-510643 | 7/2017 |
| RU | 2203553 C1 | 5/2003 |
| RU | 2328140 C1 | 7/2008 |
| WO | 9923888 A1 | 5/1999 |
| WO | 9956601 A1 | 11/1999 |
| WO | 2011074667 A1 | 6/2011 |
| WO | 2013006718 A1 | 1/2013 |
| WO | 2013192502 A1 | 12/2013 |

OTHER PUBLICATIONS

Hertz-Schünemann et al., Looking into individual coffee beans during the roasting process: direct micro-probe sampling on-line photo-ionisation mass spectrometric analysis of coffee roasting gases (Year: 2013).*

ITO, Hiroshi, Coffee Search, pp. 120-123, 1974.

English Translation and Office Action issued in connection with corresponding JP application No. 2017-510643 dated Jul. 6, 2017, 9 pages.

English Translation and Office Action issued in connection with corresponding JP application No. 2017-510643 dated Nov. 7, 2017, 6 pages.

English Translation and Notice of Allowance issued in connection with corresponding RU application No. 2017112344 dated Feb. 26, 2018, 22 pages.

English Translation and Notice of Allowance issued in connection with corresponding JP application No. 2017-510643 dated Apr. 4, 2018, 5 pages.

* cited by examiner

METHOD FOR CONTROLLING A PROCESS OF ROASTING COFFEE BEANS AND DEVICE FOR USE IN A PROCESS FOR ROASTING COFFEE BEANS

FIELD OF THE INVENTION

The invention relates to a method for controlling a process of roasting coffee beans. Furthermore, the present invention relates to a device for use in a process for roasting coffee beans.

BACKGROUND OF THE INVENTION

In the field of making coffee, there is an increasing need among consumers for freshly roasting the coffee beans to be used in the process. Currently available home roasters usually pre-set the characteristics of the roasting process for the consumers, without offering a possibility of adapting those characteristics to an initial roasting degree of the coffee beans. As a consequence, it may happen that when a consumer decides to use partially roasted beans instead of green beans, a standard duration of a roasting process is actually too long for obtaining good results, wherein the taste of the coffee may be far more bitter than expected by the consumer. In cases in which it is possible for a consumer to set characteristics of the roasting process, such as the temperature and/or the duration, it cannot be ensured that the consumer makes the right decisions.

Coffee beans are roasted by treating the beans with an airflow at high temperature, or by subjecting the beans to irradiation or heat conduction. A roasting process has a number of different stages such as dehydration, first cracking, second cracking and carbonization. In general, the roasting process involves physical and chemical changes which finally result in the coffee beans having a unique aroma and flavor. Checking bean color and listening to cracking sound are the most popular ways in which professional roasters monitor a roasting process and determine when to terminate the process. However, this way of doing requires roasting experience. An average home user cannot be expected to have the necessary knowledge of the roasting process, let alone the necessary roasting experience.

Current technologies for determining roasting degree and/or setting one or more characteristics of a roasting process focus on color sensing, wherein a light with specified wavelength, a reflector and a detector are used. However, color sensing has issues as far as accuracy of assessment of final roasting degree is concerned. Problems occur due to intra-bean and inter-bean color difference and the fact that the color difference of various roasting degrees can be very subtle. Besides color sensing, sound sensing has been proposed for detecting sound emitted during the cracking stages and thereby determining roasting degree. However, this way of doing also has disadvantages, including signal-to-noise ratio when the roasting process itself produces large noise and only vague cracking sound when roasting temperature is not high enough.

It follows from the foregoing that there is a need for intelligent roasting devices, which are adapted to help a consumer in choosing appropriate characteristics of the roasting process, and which are preferably also adapted to be operated according to a consumer's personal desires in respect of taste of the coffee.

SUMMARY OF THE INVENTION

It is an object of the invention to provide a method for controlling a process of roasting coffee beans which is accurate and applicable in a device for home roasting. It is also an object of the invention to provide a device for use in a process for roasting coffee beans which is easy to use, which does not require a user to be experienced in the field of roasting, and which offers a user a possibility of realizing roasting processes according to desired taste, wherein the device may be provided as a unit which can be coupled to a home roaster or the like, or as an integral part of a home roaster or the like.

According to the invention, a method for controlling a process of roasting coffee beans is provided, wherein measurements of an actual value of particulate matter emission from the coffee beans are performed during the roasting process in order to find a pattern of the particulate matter emission over time, wherein an actual roasting degree of the coffee beans is determined on the basis of the pattern, and wherein at least one characteristic of the roasting process is determined and set on the basis of the actual roasting degree. Also, according to the invention, a device for roasting coffee beans is provided, which comprises measuring means for performing measurements of an actual value of particulate matter emission from the coffee beans during a process of roasting the coffee beans, and controlling means coupled to the measuring means for receiving the outcome of the measurements from the measuring means, wherein the controlling means are adapted to find a pattern of the particulate matter emission over time on the basis of the outcome of the measurements, to determine an actual roasting degree of the coffee beans on the basis of the pattern, and to determine and set at least one characteristic of the roasting process on the basis of the actual roasting degree.

The invention is based on the insight that many thermal and chemical reactions occur during the roasting process, including dehydration, decarboxylation, fractionization, isomerization, polymerization, Maillard reaction, Strecker degradation, and caramelization. These reactions normally involve a change of the chemical composition of the coffee beans and the emission of by-products in the form of particulate matter, volatile organic compounds, and moisture. It has been discovered that pollutant emission has a correlation with coffee roasting stages, and it is now proposed to use this correlation for indicating roasting degree and determining one or more characteristics of the roasting process. Hence, in short, the invention is about particulate matter sensing in the context of a process of roasting coffee beans and using the values of the particulate matter as found during the process for real-time determination of the roasting degree, which enables setting at least one characteristic of the roasting process in an appropriate manner. The at least one characteristic of the roasting process may include a temperature over time, for example, and/or a duration of the process or at least a stage thereof.

In practice, a particulate matter sensor can be mounted to or integrated in a coffee roaster or a coffee machine including a roaster, particularly a so-called bean-to-cup coffee machine. The particulate matter sensor is preferably arranged at an outlet position with respect to the roaster. In general, operation of a particulate matter sensor is based on the use of a light beam which is emitted into a measurement chamber. The light is refracted by particles as present in the measurement chamber, and the amount of scattered light is detected. Known particulate matter sensors are used for the purpose of engine exhaust measurements or in air purifiers, for example. It is possible to use a particulate matter sensor for counting particles of a certain size. It has been found that in the context of roasting of coffee beans, it may be practical to detect particles having a size of 0.3 µm.

It has been found that both the dehydration stage and the cracking stages of the roasting process involve high emission of particulate matter. Hence, these stages are associated with significant peaks in a pattern of the particulate matter emission. Furthermore, it has been found that when green beans are roasted, a first peak occurs as a result of the dehydration stage in a certain time period after the start of the roasting process, for example, in a time period commencing 3 minutes from the start and ending several minutes later. When partially roasted beans are subjected to a roasting process, the dehydration stage will not occur. Hence, checking whether a peak is present or absent in a certain time period can be used for discriminating green beans from partially roasted beans, i.e. for automatically determining the initial roasting degree of coffee beans without a need of input from a user. In cases in which the peak is found, it is concluded that green beans are used, which need to be roasted during a longer time than partially roasted beans.

It follows from the foregoing that the invention can be applied for automatically adapting the duration of the roasting process to the type of coffee beans to be roasted, without needing to use complex arrangements for visually inspecting the coffee beans at the start of the roasting process, for example. In general, according to the invention, it is possible to verify whether a significant peak of the particulate matter emission occurs in a first predetermined time period after the start of the roasting process, wherein a total duration of the roasting process is set such as to be longer for a case in which the peak is found than for a case in which the peak is not found. Furthermore, as it has been found that the peak associated with dehydration is higher for beans which are roasted to a lesser extent, it is proposed to set the total duration of the roasting process in dependency of a height of the peak, wherein the total duration is set to be longer as the peak is higher. In that way, the total duration of the roasting process can be accurately adapted to the initial roasting degree of the coffee beans. In a practical embodiment, the device according to the invention may comprise a memory in which details regarding the first predetermined time period, and regarding a relation between the possible peak of the particulate matter emission and the total duration to be chosen are stored. For example, the relation between peak and duration as mentioned can be recorded in the form of a look-up table.

The cracking stages occur near the end of the roasting process. Known preferences in respect of roasting are closely linked to the cracking stages. Hence, it is desirable to provide a method on the basis of which it is possible to terminate a roasting process exactly at the correct moment of the cracking stages. For example, the following relation between roasting degree and cracking stages may be applicable:
(1) Cinnamon/light roast—Terminate roasting process at the start of the first crack
(2) American/medium roast—Terminate roasting process during the first crack
(3) City roast—Terminate the roasting process at the end of the first crack
(4) Full city roast—Terminate the roasting process at the start of the second crack
(5) Vienna roast—Terminate the roasting process during the second crack
(6) French roast—Terminate the roasting process at the end of the second crack On the basis of the fact that the cracking stages involve a significant increase of the emission of particulate matter, as has been found in the context of the invention, it is possible to apply the invention for determining actual cracking stages, so that the invention enables termination of any roasting process at exactly the right moment. In particular, according to the invention, it is advantageous to verify whether a significant peak of the particulate matter emission occurs in a second predetermined time period after the start of the roasting process, wherein one of the following actions is taken:

terminating the roasting process as soon as a first peak or a predetermined number of peaks has been found in the second predetermined time period; or terminating the roasting process at a predetermined time following a time that a first peak has been found in the second predetermined time period.

By verifying whether a significant peak of the particulate matter emission occurs in a second predetermined time period after the start of the roasting process, it is furthermore possible to set characteristics of a final stage of the roasting process as soon as a first peak has been found in the second predetermined time period. For example, a predetermined duration of the final stage and/or a predetermined roasting temperature (over time) may be set as soon as the cracking starts, wherein the characteristics can be chosen according to a user's preference in respect of the final roasting degree. In the device according to the invention, the controlling means may comprise an interface for receiving input from a user of the device regarding a desired roasting degree of the coffee beans, wherein the controlling means are adapted to use input provided by a user along with the input following from the measurements of the actual value of the particulate matter emission for determining at least one characteristic of the roasting process.

It has been found that the variation of the roasting ambient is quite large when it comes to the value of particulate matter, and that this variation may introduce large background noise for the process of sensing particulate matter emitted over time from coffee beans subjected to a roasting process. According to the invention, a solution to this problem is found in detecting particulate matter of the same size at two positions, namely one position for verifying ambient particulate matter and another position for verifying particulate matter at an outlet position with respect to the coffee beans as subjected to roasting, wherein a value of the particulate matter as found at the first position is deducted from a value of the particulate matter as found at the second position in order to obtain the actual value of particulate matter emission from the coffee beans. In the device according to the invention, the outlet position with respect to the coffee beans is an outlet position with respect to a space for accommodating the coffee beans with which the device is associated, at least during roasting processes.

The invention may further relate to a coffee machine for roasting, grinding, brewing and/or dispensing comprising a coffee roaster. Such a coffee machine provides the advantage that the taste of the coffee can be adapted according to a consumer's personal desires. The coffee machine may either be for personal use, or for professional use, for example in a restaurant. The roaster may be a device as defined above for performing the method for controlling a process of roasting coffee beans.

The above-described and other aspects of the invention will be apparent from and elucidated with reference to the following detailed description of a number of ways of how to put the invention to practice.

BRIEF DESCRIPTION OF THE DRAWINGS

The invention will now be explained in greater detail with reference to the figures, in which equal or similar parts are indicated by the same reference signs, and in which.

It is noted that in general, each of the graphs as shown in FIGS. 2, 3, 5, 6, 7, 8 and 9 represents a pattern of particulate matter emission over time from coffee beans subjected to a roasting process.

DETAILED DESCRIPTION OF EMBODIMENTS

Figure 1:
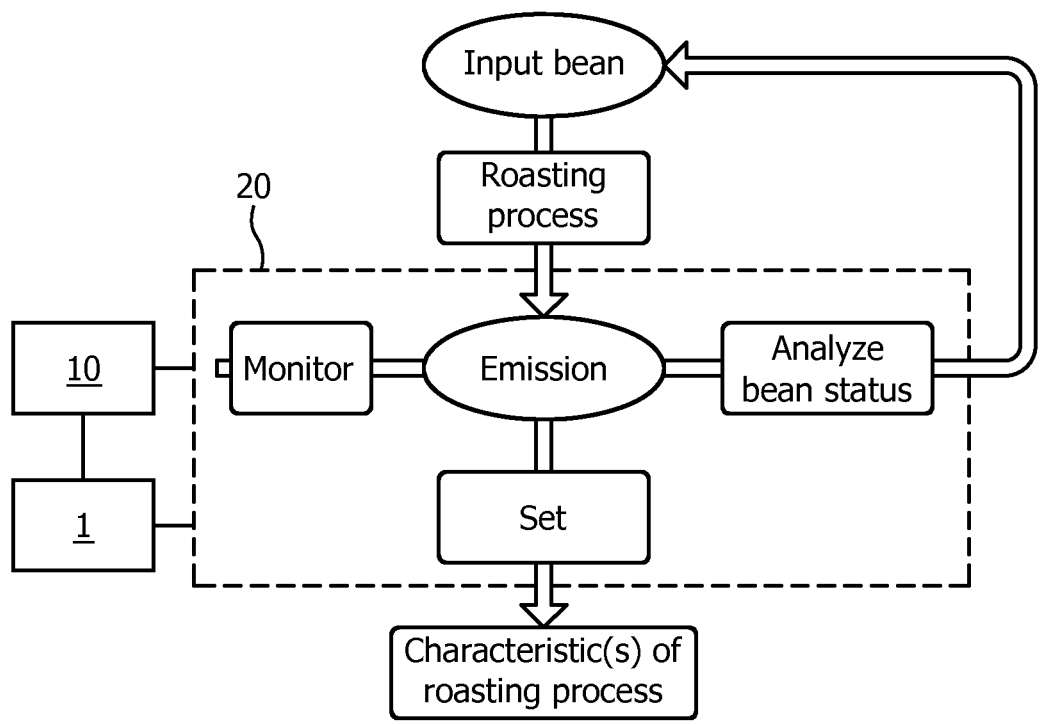
FIG. 1 shows a diagram of a procedure for determining an initial roasting degree of coffee beans.
Figure 2:
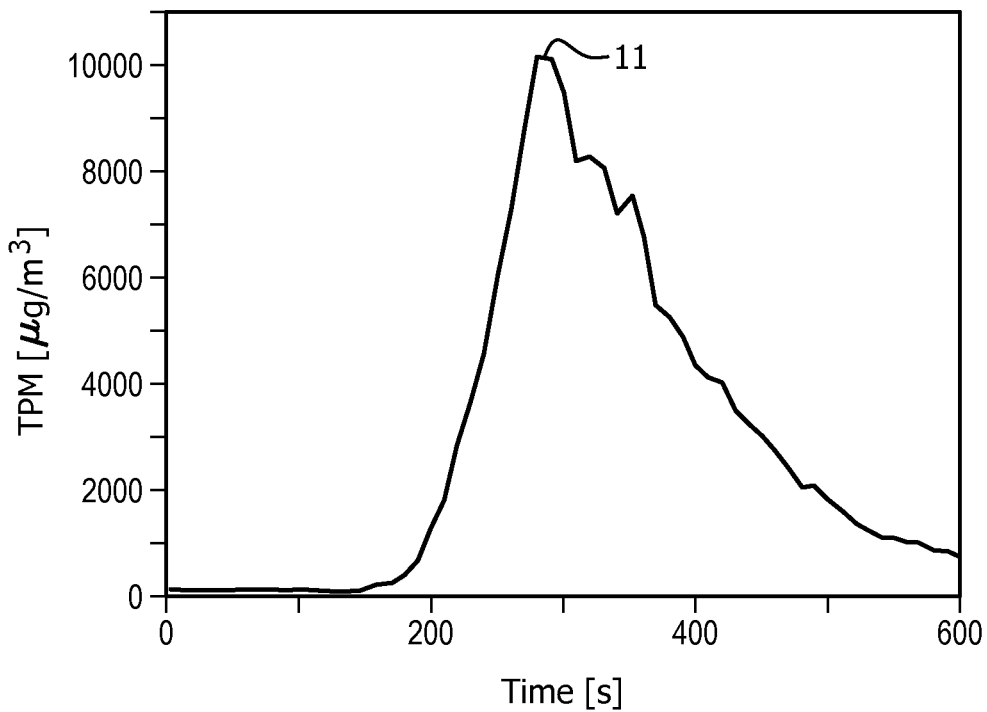
FIG. 2 shows a first possible graph of particulate matter emission over time, associated with green coffee beans.
Figure 3:
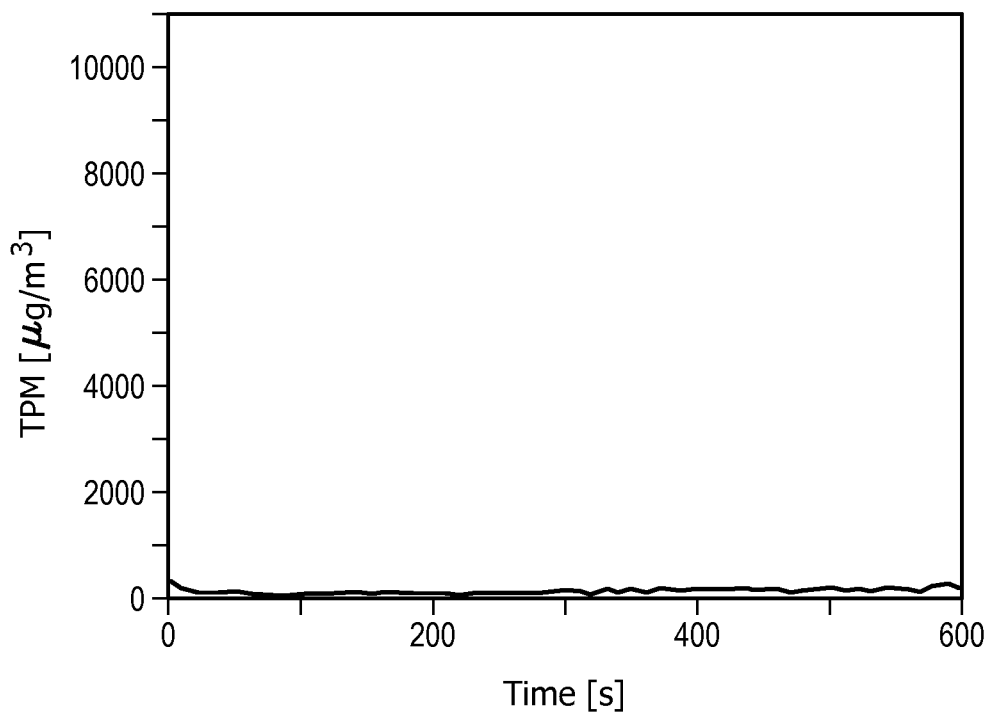
FIG. 3 shows a second possible graph of particulate matter emission over time, associated with partially roasted coffee beans.

FIG. 1 relates to a procedure for determining an initial roasting degree of coffee beans, which procedure can be performed automatically in a device comprising measuring means and controlling means without requiring actions/input from a user. FIGS. 2 and 3 show graphs for illustrating the basic principle of the procedure, wherein graph 2 relates to coffee beans which are initially green, wherein graph 3 relates to coffee beans which are initially partially roasted, and wherein it is true in respect of both graphs that the values of the x axis represent roasting time in seconds and the values of the y axis represent particulate matter in $\mu g/m^3$. The graphs have been found on the basis of processes of roasting green beans and partially roasted beans, respectively, performed in the context of investigations as to the feasibility of the invention, and by performing real-time measurements of the total particulate matter emitted from the beans during those processes.

In general, a coffee roaster 1 is equipped with at least one particulate matter sensor 10 and a controller 20 for receiving signals from the sensor 10 representing actual values of the particulate matter, for analyzing and interpreting such signals, and for using the outcome of the analysis and interpretation in a process of setting at least one characteristic of a roasting process. In FIG. 1, the coffee roaster 1, the particulate matter sensor 10 and the controller 20 are only diagrammatically indicated as boxes. The coffee roaster 1 can be any type of device which is adapted to subject coffee beans to a roasting process, and may be integrated in a coffee maker (not shown). As the invention is about how the coffee roaster 1, the particulate matter sensor 10 and the controller 20 are used in a process of obtaining excellent roasting results according to a user's desire rather than how these devices actually work, the technical details of these devices will not be elaborated on in this text, unless relevant to the process.

It follows from FIG. 2 that roasting green beans produces a high value of particulate matter emission, approximately 3 minutes after the start of the roasting process. The graph shown in FIG. 2 has been found by detecting total particulate matter. The highest value of the total particulate matter is observed around 5 minutes from the start, which value is in the order of 10,000 $\mu g/m^3$. The presence of the peak 11 of the value of the particulate matter emission indicates that a dehydration process takes place, during which water as initially present in the green beans is evaporated and generates particulate matter. On the other hand, as illustrated by means of FIG. 3, it is concluded that the beans are initially partially roasted when the total particulate matter remains constant, about 100 to 200 $\mu g/m^3$, in the time period of about 3 minutes to about 6 minutes from the start. Like the graph shown in FIG. 2, the graph shown in FIG. 3 has been found by detecting total particulate matter. Equal conditions of the roasting process, such as the quantity of the coffee beans and the temperature, are applicable to both graphs. It is noted that a typical value of the temperature associated with dehydration of the beans is approximately 180° C.

High contrast in total particulate matter of a magnitude of about 100 involves high sensitivity in distinguishing initial bean status. Hence, it follows from a comparison from the graphs that it is very well possible to determine the type of beans which are used in an actual roasting process, which offers possibilities for choosing appropriate values of one or more characteristics of the roasting process, such as duration. For example, another 15 minutes of roasting time can be set once the high peak 11 of total particulate matter has been found at about 5 minutes from the start, which yields an appropriate overall roasting time for green beans. Less additional roasting time, for example, 10 minutes, is needed when no peak 11 is detected in a first predetermined time period of about 3-6 minutes, for example. Hence, by measuring particulate matter emission during a first predetermined time period and verifying whether a peak 11 occurs, it is possible to protect green beans from under-roasting and to protect partially roasted beans from over-roasting.

Figure 4:
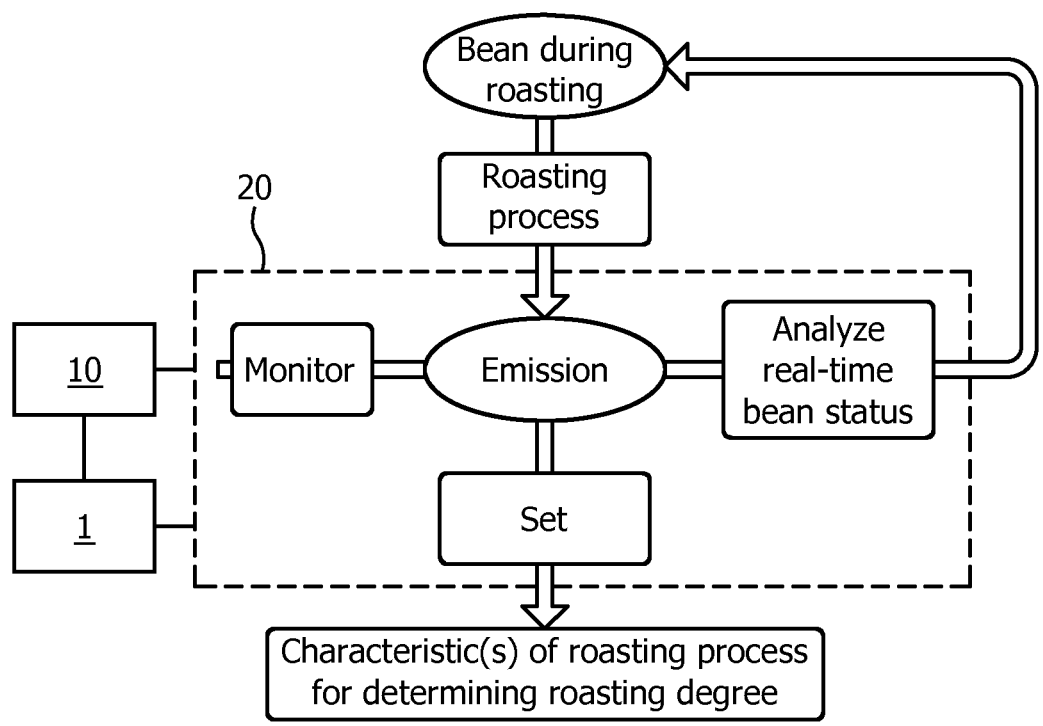
FIG. 4 shows a diagram of a procedure for determining cracking stages of a roasting process.
Figure 5:
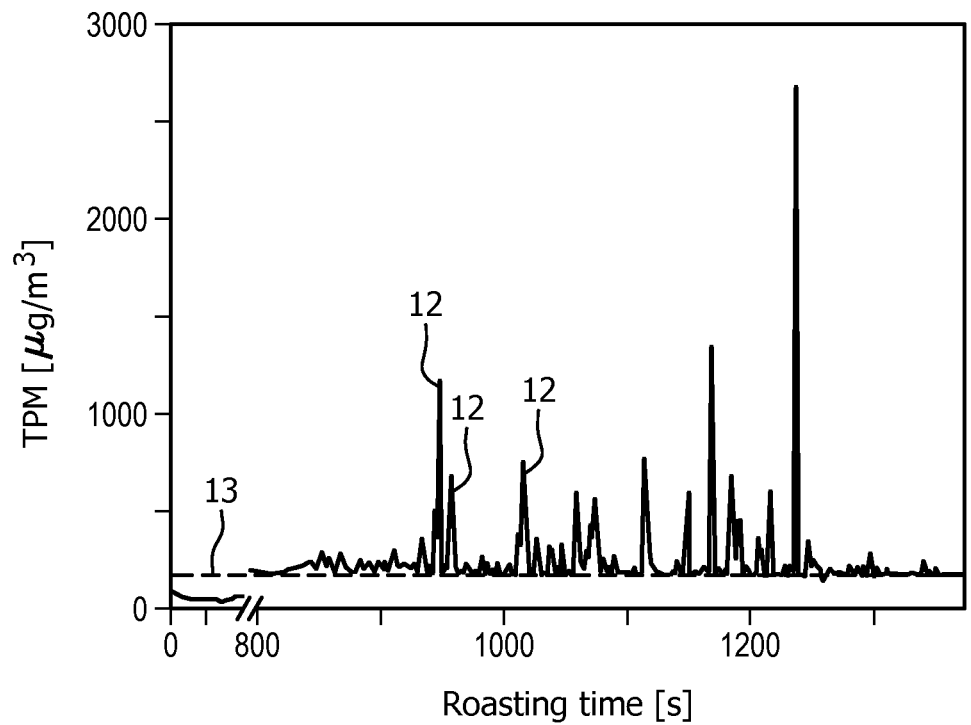
FIG. 5 shows a possible graph of particulate matter emission over time during the first cracking stage.

FIG. 4 relates to a procedure for determining a real-time roasting degree of coffee beans, which procedure can be performed automatically in a device comprising measuring means and controlling means without requiring actions/input from a user. FIG. 5 shows a graph for illustrating the basic principle of the procedure, wherein the values of the x axis represent roasting time in seconds and the values of the y axis represent particulate matter in $\mu g/m^3$. Like the graphs shown in FIGS. 2 and 3, the graph shown in FIG. 5 has been found by detecting total particulate matter in processes of roasting coffee beans, performed in the context of investigations as to the feasibility of the invention, and by performing real-time measurements of the total particulate matter emitted from the beans during those processes. In the following, the application of the procedure in the cracking stage of the roasting process will be elucidated.

In general, a coffee roaster 1 is equipped with at least one particulate matter sensor 10 and a controller 20 for receiving signals from the sensor 10 representing actual values of the particulate matter, for analyzing and interpreting such signals, and for using the outcome of the analysis and interpretation in a process of setting at least one characteristic of a roasting process. In FIG. 4, the coffee roaster 1, the particulate matter sensor 10 and the controller 20 are only diagrammatically indicated as boxes. As has been mentioned in the foregoing, the coffee roaster 1 can be any type of device which is adapted to subject coffee beans to a roasting process, and may be integrated in a coffee maker (not shown).

The first stages of a roasting process, including the dehydration stage as mentioned in the foregoing in case green beans are roasted, are warming-up stages leading up to first crack, from which moment on exothermic reactions take place. The first crack is known to usually release some of the most intense aromas of the entire process. In fact, the stage between the first crack and termination of the roasting process can be denoted as being the most critical stage of the entire process, due to the rate and sensitivity of the reactions taking place.

During the roasting process, the particulate matter sensor 10 is used to monitor the value of the emission from the coffee beans over time. On the basis thereof, it is possible to sense the start, the continuation process and the termination of the first crack. The graph of FIG. 5 relates to the time period during which the first crack takes place and clearly shows that sharp particulate matter emission peaks 12 are produced during that period. It has been found that the total particulate matter increases quickly and significantly when audible cracking sounds are detected, and drop to a baseline 13 after the crack is over. Thus, by registering sharp particulate matter emission peaks 12, the start, the continuation process and the termination of the first crack can be determined, and this can be done in a similar manner in respect of the second crack. The exact information regarding cracking status is suitable to be used in a process of setting particulars of a final roasting stage and/or determining when to terminate roasting. It is noted that it is also possible to use a timer for determining a roasting degree and for guiding roasting operation, wherein a setting of the timer can be predetermined on the basis of experience and/or experimental validation. For example, a timer may be activated as soon as it has been determined that the crack stage has started, in order to ensure that the roasting process is terminated after a time period of 2 minutes from that moment on in order to achieve a certain roasting degree such as medium roast. Hence, in such a case, the roasting process is firstly monitored on the basis of information about particulate matter emission, and subsequently controlled by means of a timer which is started at a predetermined moment in the roasting process.

Through temperature and time adjustment of the roasting process, the final roasting degree can be linked to a user's subjective evaluation of the taste in order to find an optimal setting of the characteristics of the roasting process. For example, a user who prefers a bitter coffee taste, can choose to prolong the duration of the roasting process in order to achieve a darker roasting degree. In such a case, the termination point of the roasting process can be set at the start of the second crack. A practical value of the roasting temperature during the cracking stage is typically about 220° C.-230° C. In order to have higher intensity of the cracking stage, higher roasting temperature can be applied. This results in higher frequency of the emission peaks 12 and shorter intervals for monitoring emission and providing feedback in terms of a setting of the characteristic(s) of the roasting process. The new information regarding particulate matter emission is recorded iteratively for determining an optimal setting of the roasting process according to the user's taste preference.

The particulars of the invention as described in the foregoing are confirmed by experiments which have been performed in the context of the invention. The graphs shown in FIGS. 6-9 relate to the outcome of those experiments, as will be explained below. As is the case with the other graphs, the values of the x axis of these graphs represent roasting time in seconds and the values of the y axis of these graphs represent particulate matter in $\mu g/m^3$. Also, these graphs have been found by detecting total particulate matter.

In a first experiment, 100 g of Yirgacheffe coffee beans were roasted in a home roaster 1, and the particulate matter emission was monitored during the roasting process by means of a particulate matter sensor 10.

Figure 6:
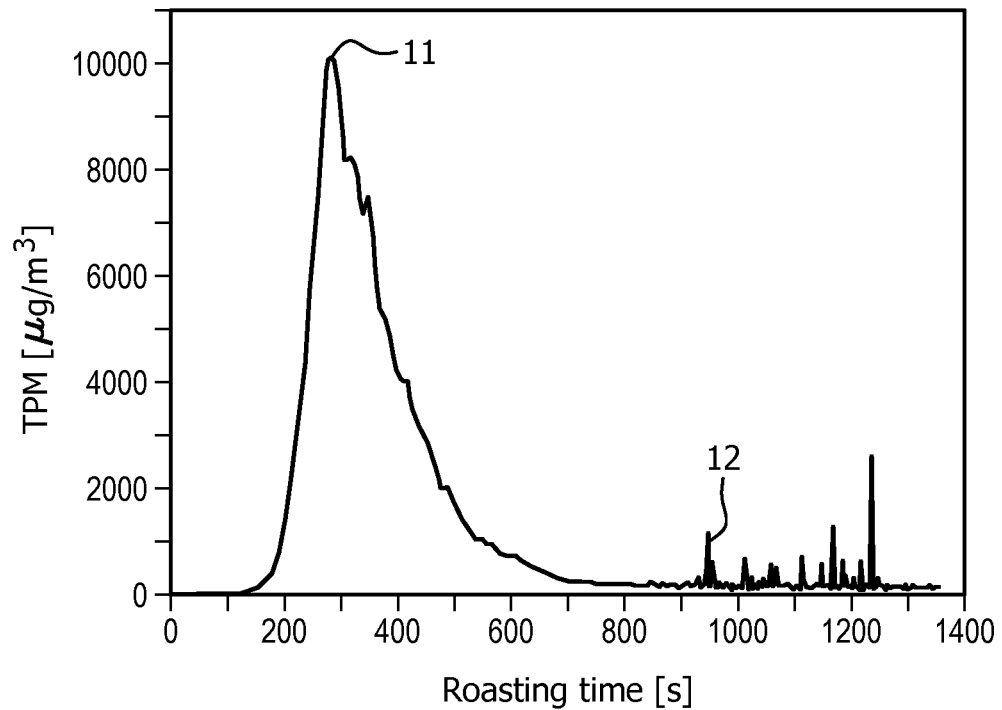
FIG. 6 shows a graph of particulate matter emission over time, measured in respect of Yirgacheffe coffee beans having an initial status as green beans.

The full particulate matter emission spectrum of Yirgacheffe green beans ($L^*$=53.8, water content=10.2%) during roasting is shown in the graph of FIG. 6. For the sake of completeness, it is noted that $L^*$ is a known color parameter indicating the lightness of the coffee beans, which is normally in the range of 0-100, wherein a lower value indicates a darker color, and which is indicative of the roasting degree of the beans. It appeared that particulate matter emission started to increase after 3 minutes of roasting time, and the maximum peak 11 was observed at 5 minutes roasting with extremely high value (about 10,000 $\mu g/m^3$ total particulate matter). Afterwards, the particulate matter emission dropped and remained constant at a much lower level, indicating the end of the dehydration stage. At a later stage, sharp peaks 12 of particulate matter emission occurred simultaneously with clear crack sounds. Different from a single broad peak 11 in the dehydration stage, a series of sharp particulate matter peaks 12 were detected in a first crack stage. Each individual peak 12 was detected at the same time that a crack sound was heard, which indicates that cracking involves emission of measurable particles and volatile organic compounds, indeed. It was observed that the value of the particulate matter dropped back to the baseline 13 immediately after the crack in question was finished. Hence, exact information regarding the real-time roasting degree of the beans can be directly derived from the occurrence of the peaks 12, considering the peaks 12 as indicators of the roasting stage.

Figure 7:
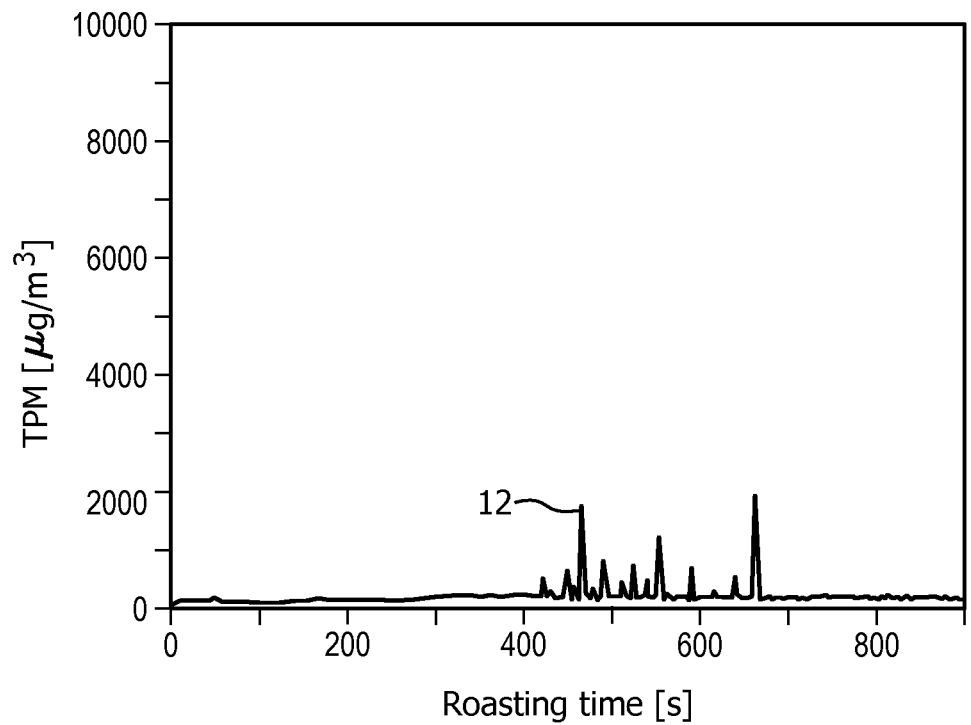
FIG. 7 shows a graph of particulate matter emission over time, measured in respect of Yirgacheffe coffee beans having an initial status as partially roasted beans.
Figure 8:
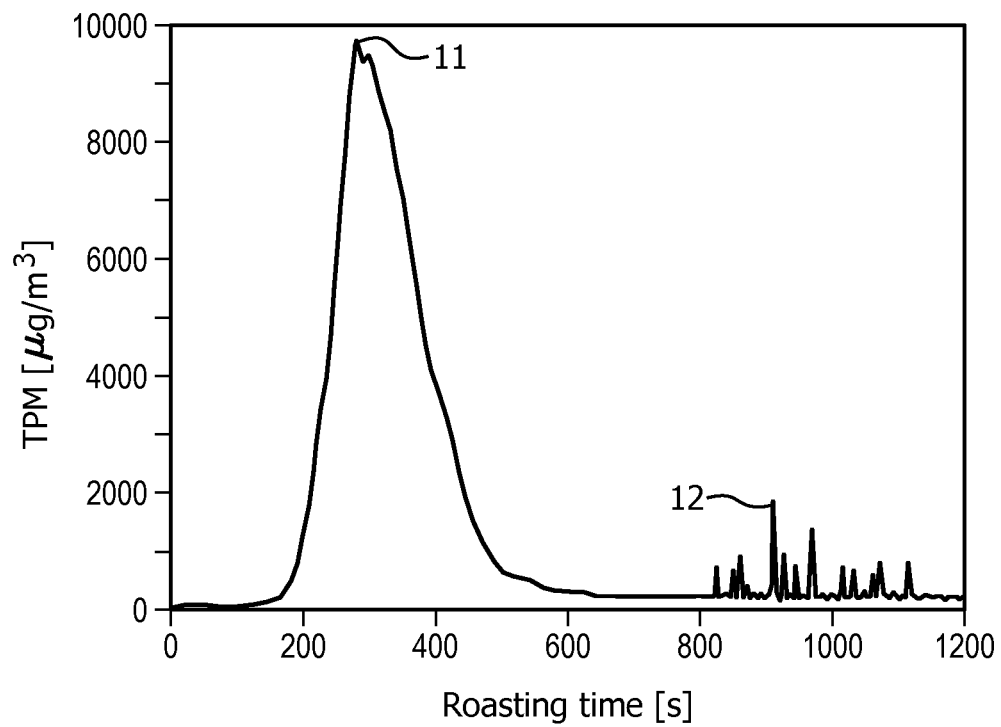
FIG. 8 shows a graph of particulate matter emission over time, measured in respect of Colombia coffee beans having an initial status as green beans.
Figure 9:
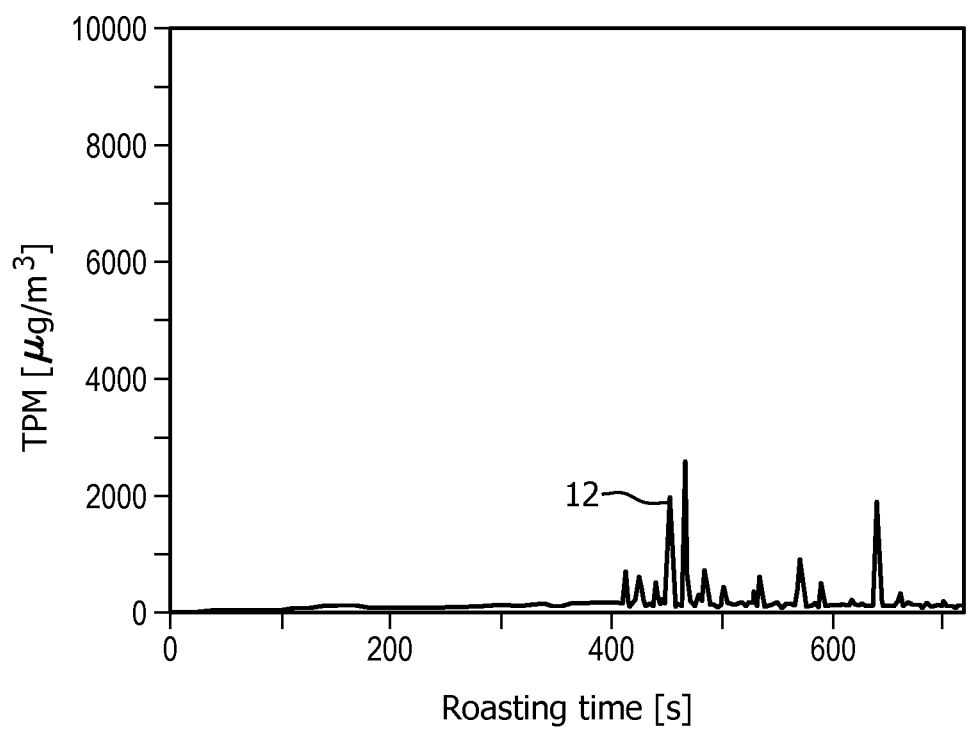
FIG. 9 shows a graph of particulate matter emission over time, measured in respect of Colombia coffee beans having an initial status as partially roasted beans.

The full particulate matter emission spectrum of Yirgacheffe partially roasted beans ($L^*$=46.5, water content=4.8%) during roasting is shown in the graph of FIG. 7. The roasting process can be denoted as being a second stage roast of Yirgacheffe coffee beans in a very light roast status. It was observed that there was no peak 11 during the first minutes of the roasting process, which is mainly due to the low water content of the partially roasted beans. The roasting was continued to the crack stage, and as soon as that stage was reached, a series of sharp peaks 12 appeared.

A second experiment with another type of coffee beans, namely Colombia coffee beans, was performed in order to investigate the generality of the invention. Two batches of Colombia beans, namely one batch of green beans and another batch of partially roasted beans, were roasted under similar conditions. The particulate matter emission was monitored and plotted as a function of roasting time, which resulted in the graphs of FIGS. 8 and 9. The Colombia green beans appeared to present a broad peak 11 during the first minutes of the roasting process, while such a peak 11 did not occur with the Colombia partially roasted beans. In respect of the crack stage, it was found that both types of beans generated a series of particulate matter emission peaks 12.

On the basis of the experiments, it is concluded that it is safe to assume that there is a general outline of the particulate matter emission during the roasting process of coffee beans, wherein a first, relatively large peak 11 is encountered only in case of green beans (or only very lightly roasted beans) during a first time period after the start of the process, and wherein a series of peaks 12 is encountered during a later/second time period after the start of the process. Hence, monitoring particulate matter is suitable for detecting initial and actual roasting degree of coffee beans, in respect of various types of beans.

An example of the first time period is a period of 3-6 minutes after the start of the roasting process. The second time period is a later period, which may start 6 minutes after the start of the roasting process, for example. In case the beans are initially green, the cracks occur at a later stage than in case the beans are initially partially roasted. Hence, it may be appropriate to have a choice in respect of the second time period, wherein the choice is dependent on whether a peak 11 is found during the first time period, or not. For example, the second time period may be a period of 6-12 minutes after the start of the roasting process in case a peak 11 is absent in the first time period, and the second time period may be a period of 13-23 minutes after the start of the roasting process in case a peak 11 is present in the first time period.

When monitoring of particulate matter emission is used for controlling a roasting process of coffee beans, it may be practical to require the particulate matter sensor 10 to be sensitive to small particles generated during the roasting with a certain size, for example, 0.3 μm. However, it appears that the indoor air quality changes from day to day, so that it has to be assumed that the variation of the roasting ambient is very large. For example, the ambient particulate matter may be around 3,000 one day and more than 40,000 another day. This variation may introduce large background noise for the procedure relying on particulate matter measuring and may even render the procedure useless.

In view of the foregoing, the invention proposes a method in which the noise caused by the indoor air quality is reduced. The proposed method is based on having a controlling arrangement in which particulate matter having a particular size can be measured at two positions, namely at a position for measuring ambient particulate matter and at a position for measuring particulate matter emitted from the coffee beans. Two particulate matter sensors can be used, wherein, when the roasting process is performed by means of a hot airflow, a first sensor can be arranged at a position where the airflow enters a space where the coffee beans are present during the roasting process, and a second sensor can be arranged at a position in the space, near an air outlet of the space. The outcome of the measurements performed by both sensors can be used for finding an actual value of the particulate matter emission from the coffee beans, wherein the outcome of the measurement performed by the first sensor is deducted from the outcome of the measurement performed by the second sensor. In this way, by relying on measurements performed by two sensors and calculating a difference, a representation of the particulate matter emission during the roasting process is found without influence of the ambient particulate matter. The two parallel particulate matter sensors can be operated simultaneously, which does not alter the fact that it is also possible to measure the ambient particulate matter only once at a moment prior to the roasting process.

Figure 10:
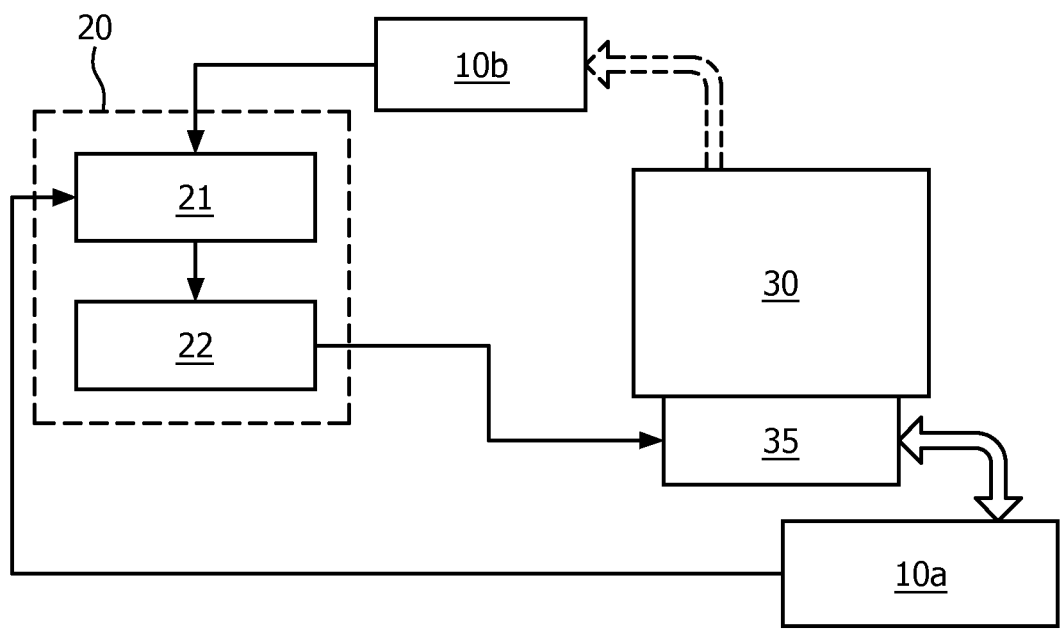
FIG. 10 shows a diagram of components of a device according to the invention as applied in combination with a roaster for roasting coffee beans by treating the beans with an airflow at high temperature.
Figure 11:
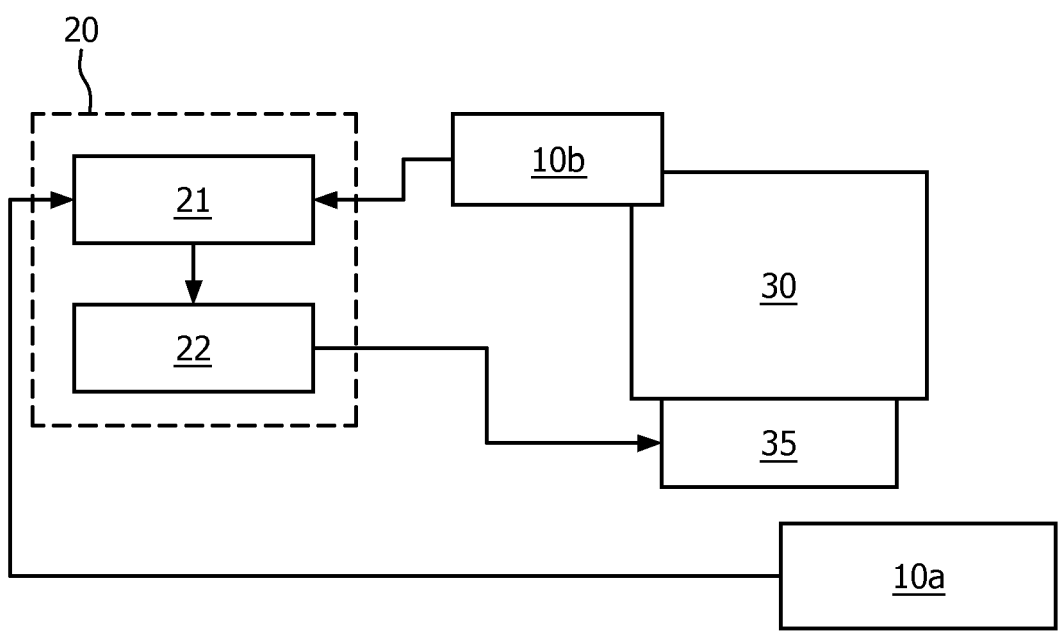
FIG. 11 shows a diagram of components of a device according to the invention as applied in combination with a roaster for roasting coffee beans on the basis of another heating principle than using a flow of hot air.

The application of two particulate matter sensors 10*a*, 10*b* is illustrated in FIGS. 10 and 11, wherein various components are diagrammatically depicted as boxes, and wherein a space for accommodating the coffee beans is indicated by means of the reference numeral 30 and an associated heating unit is indicated by means of the reference numeral 35. FIG. 10 relates to a case in which the roasting process takes place by supplying a hot airflow to the beans. In this case, a first particulate matter sensor 10*a* is used to monitor the particle counts from the ambient with specific size, for example, 0.3 μm. A second particulate matter sensor 10*b* is used to monitor the particle counts with the same size as the first particulate matter sensor 10*a*. An input airflow, which is represented by two continuous arrows, is heated by the heating unit 35. The first particulate matter sensor 10*a* can be placed at a position upstream of the heating unit 35 or in a branch of the input airflow. In the shown example, an output airflow, which is represented by a dashed arrow, is monitored by the second particulate matter sensor 10*b*, which does not alter the fact that the second particulate matter sensor 10*b* may also be arranged inside the space 30. In any case, the outcome of the measurements performed by the sensors 10*a*, 10*b* is processed by a particulate matter monitoring module 21 of the controller 20, which is adapted to deduct the value detected by the first sensor 10*a* from the value detected by the second sensor 10*b*. On the basis of the actual value of the particulate matter which is found in this way, the settings of the roasting process are determined in a way as described in the foregoing and actually set by a roasting control module 22 of the controller 20.

In another embodiment, as diagrammatically shown in FIG. 11, the invention is applied to a roaster operating on the basis of another heating principle than the principle of supplying a hot airflow. Despite the absence of an airflow, the ambient particles contribute as background noises in particulate matter sensing, due to the fact that the space 30 where the coffee beans are present is normally not a sealed container. Preferably, in this situation, the second particulate matter sensor 10*b* is arranged inside the space 30 in order to be at a position for detecting particulate matter emitted from the coffee beans.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

The invention claimed is:

1. A method for controlling a process of roasting coffee beans, wherein measurements of an actual value of emission of particulate matter of a specific size from the coffee beans are performed during the roasting process in order to find a pattern of a plurality of patterns of the emission of the particulate matter over time, wherein the particulate matter of same size is detected at two positions, a first position to verify ambient particulate matter and a second position to verify the particulate matter at an outlet for output airflow, wherein the first position is a position where the coffee beans are present during the roasting process, wherein an actual roasting degree of the coffee beans is determined on the basis of the pattern of the plurality of patterns of the emission of the particulate matter, wherein at least one characteristic of the roasting process is determined and set on the basis of the actual roasting degree, wherein each pattern of the plurality of patterns includes values of one or more peaks and values of one or more non-peaks in a predetermined time period, and wherein the actual roasting degree is determined on the basis of height of the one or more peaks and a number of the one or more peaks in the pattern of the plurality of patterns of the emission of the particulate matter.

2. The method according to claim 1, wherein it is verified whether a specific peak of the emission of the particulate matter occurs in a first predetermined time period after the start of the roasting process, and wherein a total duration of the roasting process is set such as to be longer for a case in which the specific peak is found than for a case in which the specific peak is not found.

3. The method according to claim 2, wherein the total duration of the roasting process is set in dependency of a height of the specific peak, and wherein the total duration is set to be longer as the specific peak is higher.

4. The method according to claim 1, wherein it is verified whether a specific peak of the emission of the particulate matter occurs in a second predetermined time period after the start of the roasting process, and wherein one of the following actions is taken:
   terminating the roasting process as soon as a first peak or a predetermined number of peaks has been found in the second predetermined time period; or
   terminating the roasting process at a predetermined time following a time that a first peak has been found in the second predetermined time period.

5. The method according to claim 1, wherein it is verified whether a specific peak of the emission of the particulate matter occurs in a second predetermined time period after the start of the roasting process, and wherein characteristics of a final stage of the roasting process are set as soon as a first peak has been found in the second predetermined time period.

6. The method according to claim 1, wherein a value of the ambient particulate matter as found at the first position is deducted from a value of the particulate matter as found at the second position in order to obtain the emission of the particulate matter from the coffee beans.

7. A device for controlling roasting of coffee beans, the device comprising:
   measuring means for performing measurements of an actual value of emission of particulate matter of a specific size from the coffee beans during a roasting process of the coffee beans, wherein the measuring means are adapted to detect the particulate matter of same size at two positions, a first position to verify ambient particulate matter and a second position to verify the particulate matter at an outlet for output airflow, and wherein the first position is a position where the coffee beans are present during the roasting process; and
   controlling means coupled to the measuring means for receiving an outcome of the measurements from the measuring means, wherein the controlling means are adapted to find a pattern of a plurality of patterns of the emission of the particulate matter over time on the basis of the outcome of the measurements, to determine an actual roasting degree of the coffee beans, and to determine and set at least one characteristic of the roasting process on the basis of the actual roasting degree, wherein each pattern of the plurality of patterns includes values of one or more peaks and values of one or more non-peaks in a predetermined time period, and wherein the controlling means are further adapted to determine the actual roasting degree on the basis of height of the one or more peaks and a number of the one or more peaks in the pattern of the plurality of patterns of the emission of the particulate matter.

8. The device according to claim 7, wherein the measuring means comprise at least one particulate matter sensor.

9. The device according to claim 7, wherein the controlling means are further adapted to verify whether a specific peak of the emission of the particulate matter occurs in a first predetermined time period after the start of the roasting process, and to set a total duration of the roasting process such as to be longer for a case in which the specific peak is found than for a case in which the specific peak is not found.

10. The device according to claim 9, wherein the controlling means are adapted to set the total duration of the roasting process in dependency of a height of the specific peak, and to set the total duration to be longer as the specific peak is higher.

11. The device according to claim 7, wherein the controlling means are further adapted to verify whether a specific peak of the emission of the particulate matter occurs in a second predetermined time period after the start of the roasting process, and to perform one of the following actions:
   terminating the roasting process as soon as a first peak or a predetermined number of peaks has been found in the second predetermined time period; or
   terminating the roasting process at a predetermined time following a time that a first peak has been found in the second predetermined time period.

12. The device according to claim 7, wherein the controlling means are further adapted to verify whether a specific peak of the emission of the particulate matter occurs in a second predetermined time period after the start of the roasting process, and to set characteristics of a final stage of the roasting process as soon as a first peak has been found in the second predetermined time period.

13. The device according to claim 7, further comprising a space for accommodating the coffee beans, the space for accommodating the coffee beans comprising a position for input airflow and the outlet for the output airflow, wherein the measuring means are adapted to measure particulate matter at the outlet with respect to the space for accommodating the coffee beans.

14. The device according to claim 7, further comprising a space for accommodating the coffee beans, the space for accommodating the coffee beans comprising a position for input airflow and the outlet for the output airflow, wherein the controlling means are further adapted to deduct a value of the ambient particulate matter as found at the first position from a value of the particulate matter as found at the second position in order to obtain the actual value of the emission of the particulate matter of the specific size from the coffee beans during the roasting process.

15. The device according to claim 7, wherein the controlling means are adapted to set a temperature of the roasting process at least on the basis of the height of the one or more peaks and the number of the one or more peaks in the pattern of the plurality of patterns of the emission of the particulate matter.

16. A control unit for controlling roasting of coffee beans, wherein the control unit is configured to:

receive, from a measuring unit, measurements of an actual value of emission of particulate matter of a specific size from the coffee beans during a roasting process of the coffee beans, wherein the actual value is determined by counting particles of the particulate matter;

detect, from the measuring unit, the particulate matter of same size at two positions, a first position to verify ambient particulate matter and a second position to verify the particulate matter at an outlet for output airflow, wherein the first position is a position where the coffee beans are present during the roasting process;

find a pattern of a plurality of patterns of the emission of the particulate matter over time based on the received measurements, wherein each pattern of the plurality of patterns includes values of one or more peaks and values of one or more non-peaks in a predetermined time period;

determine an actual roasting degree of the coffee beans at least partially based on height of the one or more peaks and a number of the one or more peaks in the pattern of the plurality of patterns of the emission of the particulate matter; and set at least one characteristic of the roasting process based on the determined actual roasting degree.

17. The control unit according to claim 16, wherein the control unit is further configured to verify whether a specific peak of the emission of the particulate matter occurs in a first predetermined time period after the start of the roasting process, and to set a total duration of the roasting process such as to be longer for a case in which the specific peak is found than for a case in which the specific peak is not found.

18. The control unit according to claim 17, wherein the control unit is further configured to set the total duration of the roasting process in dependency of a height of the specific peak, and to set the total duration to be longer as the specific peak is higher.

19. The control unit according to claim 16, wherein the control unit comprises an interface for receiving input from a user regarding a desired roasting degree of the coffee beans, and wherein the control unit is further configured to use the input provided by the user for determining the at least one characteristic of the roasting process.

* * * * *